United States Patent
Uchida et al.

(10) Patent No.: US 9,516,194 B2
(45) Date of Patent: Dec. 6, 2016

(54) METHOD FOR CORRECTING SHADING AND SCANNER DEVICE

(71) Applicant: HITAHCI INFORMATION & TELECOMMUNICATION ENGINEERING, LTD., Nisi-ku, Yokohama-shi, Kanagawa (JP)

(72) Inventors: Yasuhiro Uchida, Nakai-Machi (JP); Takahiro Sato, Nakai-Machi (JP); Masaki Ikemoto, Nakai-Machi (JP)

(73) Assignee: HitachiInformation & Telecommunication Engineering, Kanagawa (JP)

( * ) Notice: Subject to any disclaimer, the term of this patent is extended or adjusted under 35 U.S.C. 154(b) by 0 days.

(21) Appl. No.: 14/907,195

(22) PCT Filed: Jul. 3, 2014

(86) PCT No.: PCT/JP2014/068373
§ 371 (c)(1),
(2) Date: Jan. 22, 2016

(87) PCT Pub. No.: WO2015/012109
PCT Pub. Date: Jan. 29, 2015

(65) Prior Publication Data
US 2016/0173722 A1 Jun. 16, 2016

(30) Foreign Application Priority Data

Jul. 25, 2013 (JP) ................................. 2013-154842

(51) Int. Cl.
*G06K 15/02* (2006.01)
*H04N 1/401* (2006.01)
(Continued)

(52) U.S. Cl.
CPC ................. *H04N 1/401* (2013.01); *G06T 1/20* (2013.01); *H04N 1/00013* (2013.01);
(Continued)

(58) Field of Classification Search
USPC ................ 358/1.2, 2.1, 3.26, 504, 505, 509, 512,358/516–520, 409
See application file for complete search history.

(56) References Cited

U.S. PATENT DOCUMENTS 4,661,861 A * 4/1987 Rutherford .............. H04N 1/04
358/300

FOREIGN PATENT DOCUMENTS

| JP | 2008-187529 A | 8/2008 |
| JP | 2010-056732 A | 3/2010 |
| JP | 2012-103291 A | 5/2012 |

* cited by examiner

*Primary Examiner* — Marcellus Augustin
(74) *Attorney, Agent, or Firm* — R. Neil Sudol; Henry D. Coleman (57) ABSTRACT

A shading correction of removing a plurality of shading factors is performed. A scanner device performs a shading correction in a manner such that a low-pass filter circuit (14) extracts a broad waveform change component caused by a temperature characteristic and a temporal change in light source or sensor sensitivity as shading factors, a phase/amplitude synchronizing circuit (15) extracts a phase shift of a cycle pattern of a lens array, a first multiplying circuit (16) synthesizes the waveforms of the extracted factors so as to form a correction-purpose image signal waveform, and the correction-purpose image signal waveform is divided from an image signal waveform subjected to a dark level correction (offset).

4 Claims, 6 Drawing Sheets (51) Int. Cl.
*H04N 1/00* (2006.01)
*G06T 1/20* (2006.01)
*H04N 1/04* (2006.01)
(52) U.S. Cl.
CPC ..... *H04N 1/00018* (2013.01); *H04N 1/00034* (2013.01); *H04N 1/00045* (2013.01); *H04N 1/00063* (2013.01); *H04N 1/00087* (2013.01); *H04N 1/04* (2013.01); *H04N 2201/0081* (2013.01)

METHOD FOR CORRECTING SHADING AND SCANNER DEVICE

TECHNICAL FIELD

The present invention relates to a method for correcting shading and a scanner device used to optically read characters, symbols, and the like recorded on a sheet or the like by using an image sensor coming into close contact with the sheet or the like, and particularly, to a method for correcting shading and a scanner device capable of decreasing density irregularity in a read image.

BACKGROUND ART

Generally, in order to compensate density irregularity among pixels caused by illumination irregularity of a reading-purpose light source, a scanner device stores dark reference data obtained when an image signal output from an image sensor reading an image while a reading-purpose light source is turned off is converted into digital data and white reference data obtained when an image signal output from the image sensor reading a white reference image is converted into digital data and compensates density irregularity among pixels of digital data converted from an analog signal output from the image sensor by an analog/digital (A/D) converter based on a shading correcting function. Usually, the shading means mismatching in conversion characteristic between an image signal and original luminance of an object image caused by irregularity in sensitivity of an imaging element and vignetting of a camera optical system of an image processing device.

Patent Document 1 below is known as a citation list for the technique of the scanner device having the above-described shading correcting function. Patent Document 1 discloses a technique including an illumination unit, a lens array, a photoelectric conversion member that converts light from the lens array into an electric signal, a white shading correcting circuit and a black shading correcting circuit that are used to correct the electric signal from the photoelectric conversion member, a storage unit that stores a plurality of correction data respectively used in the white shading correcting circuit and the black shading correcting circuit, and a control unit that controls the illumination unit, the photoelectric conversion member, the white shading correcting circuit, the black shading correcting circuit, and the storage unit. Here, the control unit can reduce an influence caused by a change in temperature by selecting correction data among a plurality of correction data and controlling the white shading correcting circuit and the black shading correcting circuit so that the electric signal is corrected based on the selected correction data.

CITATION LIST

Patent Document

Patent Document 1: JP 2010-65732A

DISCLOSURE OF THE INVENTION

Problem to be Solved by the Invention

In the above-described technique disclosed in Patent Document 1, a plurality of correction data corresponding to a change in temperature during production is stored, and an influence caused by a change in temperature can be reduced by using the correction data. However, a problem arises in that various correction data for a change in temperature are not easily prepared, the shading is not caused only by a change in temperature, and the shading is not easily and sufficiently corrected.

This problem will be described in detail. Regarding a main circuit configuration, the scanner device includes an illumination unit, an optical system that is obtained by combining a CMOS-type image sensor with a rod lens, a lens array, and a SELFOC lens receiving light emitted from the illumination unit and reflected by an object, an offset correcting circuit that performs an offset correction on a dark level waveform in a dark state (a non-illumination state), a sample holding circuit that clamps a level for each pixel or clamps a level for a pixel of each line unit and holds an effective level, a programmable amplifying circuit that amplifies a signal held by the sample holding circuit, and an A/D conversion circuit that converts an analog signal into a digital signal. Here, the offset correcting circuit performs an offset correction by subtracting the dark level waveform from an original reading level waveform read by the image sensor and divides the original reading level waveform subjected to the offset correction by a white level waveform so as to normalize the reading waveform.

Since the image sensor output is "0" even in a dark state (a non-illumination state) and the output level of each image sensor in a dark state is different, the dark level correction is used to adjust the output level so that the output level does not become "0" or less by using an offset. Further, since the image sensor output is not uniform even in a uniform white state (so that the sensor output largely changes by about ±30%), the white level correction is used to store reference white for a correction.

Regarding the white level correction, the white irregularity is substantially continuous in actual and a demanded specification can be satisfied within a standard in a specific shape at random in each pixel. However, it is difficult to depend on the "continuity of adjacent pixels". As the white irregularity, various factors below are considered.

As the factors of the white irregularity, the followings are considered. (1) Impurities are formed during the production process of the sensor pixel. As a result, the white irregularity occurs due to the impurities inside different sensor pixels having different sensitivities. (2) Since the CMOS-type image sensor as a contact sensor is generally formed by connecting a plurality of sensor chips (elements), there is a case in which a specific portion has specific sensitivity due to an internal circuit configuration in accordance with the sensor chip. As a result, the white irregularity occurs due to the sensitivity irregularity inside the sensor chip in which the specific sensitivity is repeated as a specific pattern every chip. (3) In the case of an elongated light source, a uniform illumination in the longitudinal direction is difficult so that illumination irregularity occurs. Alternatively, in the case of an optical reduction system, luminance irregularity occurs at the center and the periphery thereof. As a result, the white irregularity occurs due to the irregularity of the light source and the optical system. (4) In the case of a contact sensor, since a lens [SELFOC (trademark) lens] in which rod lenses are arranged is used, a sine wave-shaped irregularity (a shape like a production-time white level waveform b of FIG. 2) occurs every cycle. For example, in the case of a SLA series manufactured by Nippon Sheet Glass Co. Ltd. and used in a scanner or a multifunction printer, the pitch of the lens is about 0.3 mm. In the case of an image sensor of 600 dpi (0.04233 mm/pixel), a sine wave is substantially formed at a cycle of seven pixels. As a result, the white irregularity occurs due to the irregularity of the lens array of several % to several tens % depending on the lens. Further, the white level irregularity as the reference is not uniform and is changed. For this reason, in the technique handling a change in temperature disclosed in Patent Document 1, a problem arises in that the shading correction is not easily and sufficiently performed.

A change in white level irregularity is caused by the following factors. (1) There is a temporal change in light source due to a change in shading and a decrease in light amount of the light source for a long period of time. (2) When the light source is a fluorescent tube, a large change including a change in shading occurs for a short time of period. In the case of an LED (Light Emitting Diode) generally used as a contact sensor, a change for a short period of time (a single continuous reading time) can be ignored. However, there are temperature characteristic factors of the light source and the sensor which cannot be ignored for one day. (3) There is a temperature factor caused by a change in phase of a sine wave pattern in accordance with a minute movement caused by a change in temperature of a lens array obtained by connecting sensor chips (elements). Particularly, as for the temperature factor of the lens array mentioned in (3), in the case of a SLA series manufactured by Nippon Sheet Glass Co. Ltd. and used in a scanner or a multifunction printer, the pitch of the lens is about 0.3 mm. In the case of an A3 scanner, the longitudinal length is about 300 mm. For example, a phase shift of ¼ occurs due to a minute change of 75 um (a shrinkage degree of 0.025%). It is difficult to predict a phase shift by a lens fixing method and a micro-change method due to a temperature.

Figure 2:
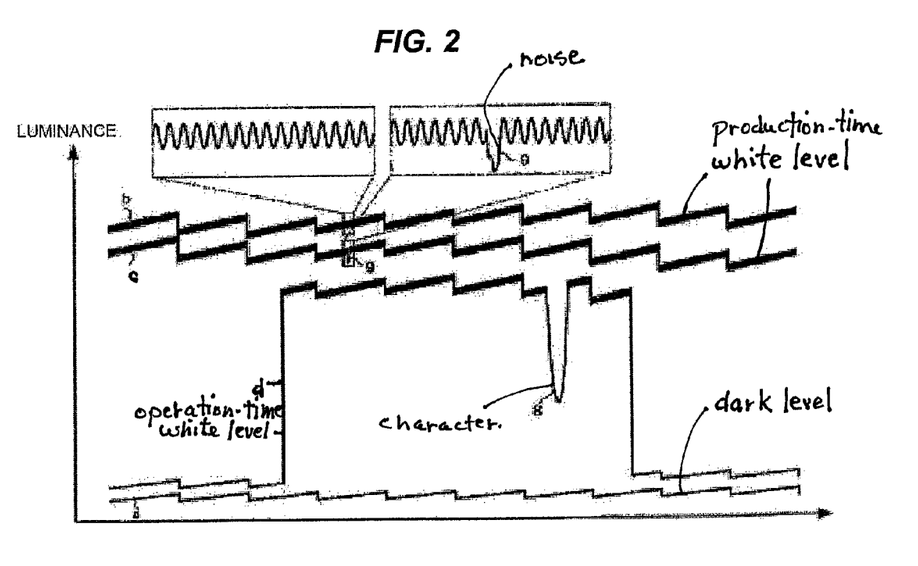
FIG. 2 is a diagram illustrating a luminance signal obtained by the method for correcting shading according to the embodiment.
Figure 6:
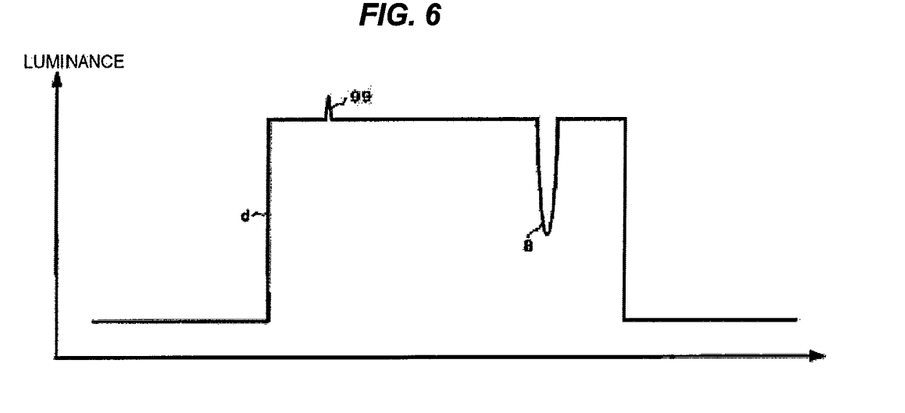
FIG. 6 is a diagram illustrating a signal waveform according to the embodiment.

Further, as a shading correction of correcting and normalizing the irregularity of the dark level and the white level of the related art, there is known a technique of reading data of an image sensor while an illumination unit is turned off immediately before an original is read, storing a dark level waveform (a dark level waveform a of FIG. 2), reading white as a reference, storing a white level waveform (an operation-time white level waveform c of FIG. 2), calculating an equation of "dark level÷white level", using the calculation result as a correction value, and reading characters and symbols of a sheet so as to obtain an original reading level waveform (an original reading level waveform d of FIG. 2). However, there is a case in which the reading image is bright (a white vertical stripe appears on an output image including original characters 8 illustrated in FIG. 6 so that an error 99 is formed in the original reading level waveform d due to dust) when the white reference inside the device is stained by the dust of the sheet original so that the white member is dark partially. Meanwhile, there is a case in which the reading image is dark (a black vertical stripe appears on the output image) while the white member is bright partially. In order to prevent these problems, a method of obtaining a plurality of white references while moving a sensor or a white member, an adjacent interpolation method of detecting and interpolating stained pixels by referring to adjacent pixels, or a production-time white reference interpolating method of storing a white level in production is considered. However, in the method of using a plurality of white references, a movement mechanism is needed. In the adjacent interpolation method, precision is not guaranteed due to the white level irregularity. Further, in the production-time white reference interpolating method, a change in white level irregularity cannot be absorbed and appears on the image. Particularly, a phase shift of a lens array cannot be absorbed and a vertical stripe-shaped cycle pattern appears. This cycle pattern is easily recognized by eyes.

Likewise, various shading factors exist and the white level irregularity changes. Thus, the related art has a problem in which various shadings are not easily handled.

The invention is made to solve the above-described problems of the related art, and an object of the invention is to provide a method for correcting shading and a scanner device capable of correcting shading caused by various factors.

MEANS FOR SOLVING PROBLEM

In order to achieve the above-described object, according to the invention of claim 1, there is provided a scanner device that optically scans an image recorded on an original by an image sensor, including: an image sensor that reads an image of an original and a white reference inside the scanner device; a production-time white level waveform memory that stores a production-time white level waveform read by the image sensor when the scanner device is produced; an A/D converter that converts an analog image signal read by the image sensor into a digital image signal; a dark level waveform memory that stores a dark level waveform read by the image sensor in a non-illumination state; a dark level correcting circuit that performs a dark level correction by subtracting the dark level waveform output from an image signal waveform output from the analog circuit and ND converter by the use of the dark level waveform stored in the dark level waveform memory; a first dividing circuit that performs a white level correction of dividing the production-time white level waveform stored in the production-time white level waveform memory from an image signal waveform subjected to a dark correction and output from the dark level correcting circuit; a low-pass filter circuit that outputs an image signal waveform of a broad change component caused by a temporal change in light source or sensor sensitivity and a temperature characteristic by outputting only a low-frequency component of the image signal waveform output from the first dividing circuit; a phase/amplitude synchronizing circuit that outputs a cycle pattern caused by a phase shift of a lens cycle pattern separated from a low-frequency component or a noise component by synchronizing the phase and the amplitude of the image signal waveform output from the low-pass filter circuit based on the input of the white level correction image signal waveform output from the first dividing circuit; a first multiplying circuit that outputs a result obtained by multiplying the cycle pattern of the phase shift output from the phase/amplitude synchronizing circuit with the image signal waveform of the broad change component output from the low-pass filter circuit; a second multiplying circuit that outputs a correction white level waveform obtained by multiplying the production-time white reference level waveform stored in the production-time white level waveform memory from the image signal waveform obtained by multiplying the cycle pattern of the phase shift and the image signal waveform of the broad change component by the first multiplying circuit; a correction white level waveform memory that stores the correction white level waveform output from the second multiplying circuit; and a dividing circuit that outputs a result obtained by dividing the correction white level waveform output by the correction white level waveform memory from the dark correction image signal waveform output by the dark level correcting circuit.

According to the invention of claim 2, in order to extract only the cycle pattern of the signal waveform caused by the phase shift of the cycle pattern, the phase/amplitude synchronizing circuit includes an AC component extracting function of extracting an AC component from a waveform, a gentle amplitude change extracting function of extracting a gentle change in amplitude of an AC component waveform extracted by the AC component extracting function by the use of a peak holding low-pass filter, and a sine wave synthesizing function of synthesizing a sine wave having a matched phase by a phase synchronizing circuit.

According to the invention of claim 3, there is provided A method for correcting shading in a scanner device including an image sensor that reads an image of an original and a white reference inside the scanner device, a production-time white level waveform memory that stores a production-time white level waveform read by the image sensor during the production of the device, an A/D converter that converts an analog image signal read by the image sensor into a digital image signal, a dark level waveform memory that stores a dark level waveform read by the image sensor in a non-illumination state, and a dark level correcting circuit that performs a dark level correction by subtracting the dark level waveform from the image signal waveform output from the analog circuit and A/D converter by the use of the dark level waveform stored in the dark level waveform memory and optically scanning the image of the original by the image sensor, the method for correcting shading including: a first dividing step of performing a white level correction of dividing the production-time white level waveform stored in the production-time white level waveform memory from the image signal waveform subjected to a dark correction and output by the dark level correcting circuit; a low-pass filter step of outputting an image signal waveform of a broad change component caused by a temporal change in light source or sensor sensitivity and a temperature characteristic by outputting only a low-frequency component of the image signal waveform output by the first dividing step; a phase/amplitude synchronizing step of outputting a cycle pattern caused by a phase shift of a lens cycle pattern separated from a low-frequency component or a noise component by synchronizing the phase and the amplitude of the image signal waveform output from the low-pass filter step based on the input of the white level correction image signal waveform output by the first dividing step; a first multiplying step of outputting a result obtained by multiplying the cycle pattern of the phase shift output in the phase/amplitude synchronizing step by the image signal waveform of the broad change component output in the low-pass filter step; a second multiplying step of outputting a correction white level waveform obtained by multiplying the production-time white reference level waveform stored in the production-time white level waveform memory from the image signal waveform obtained by multiplying the cycle pattern of the phase shift and the image signal waveform of the broad change component in the first multiplying step; a correction white level waveform memory step of storing the correction white level waveform output in the second multiplying step; and a second dividing step of outputting a result obtained by dividing the correction white level waveform output in the correction white level waveform memory step from the dark correction image signal waveform output in the dark level correction step.

According to the invention of claim 4, in order to extract only the cycle pattern of the signal waveform caused by the phase shift of the cycle pattern, the phase/amplitude synchronizing step includes an AC component extracting step of extracting an AC component from a waveform, a gentle amplitude change extracting step of extracting a gentle change in amplitude of an AC component waveform extracted by the AC component extracting step by the use of a peak holding low-pass filter, and a sine wave synthesizing step of synthesizing a sine wave having a matched phase by a phase synchronizing step.

EFFECT OF THE INVENTION

In the method for correcting shading and the scanner device according to the invention, it is possible to perform a shading correction of removing shading factors in a manner such that the low-pass filter circuit extracts the broad waveform change component caused by a temporal change in light source or sensor sensitivity and a temperature characteristic as shading factors, the phase/amplitude synchronizing circuit extracts the phase shift of the cycle pattern of the lens array, and the extracted correction-purpose image signal waveform is removed from the image signal waveform subjected to the dark level correction (offset).

MODE(S) FOR CARRYING OUT THE INVENTION

Hereinafter, an embodiment of a scanner device that employs a method for correcting shading of the invention will be described in detail with reference to the drawings.

[Configuration]

Figure 1:
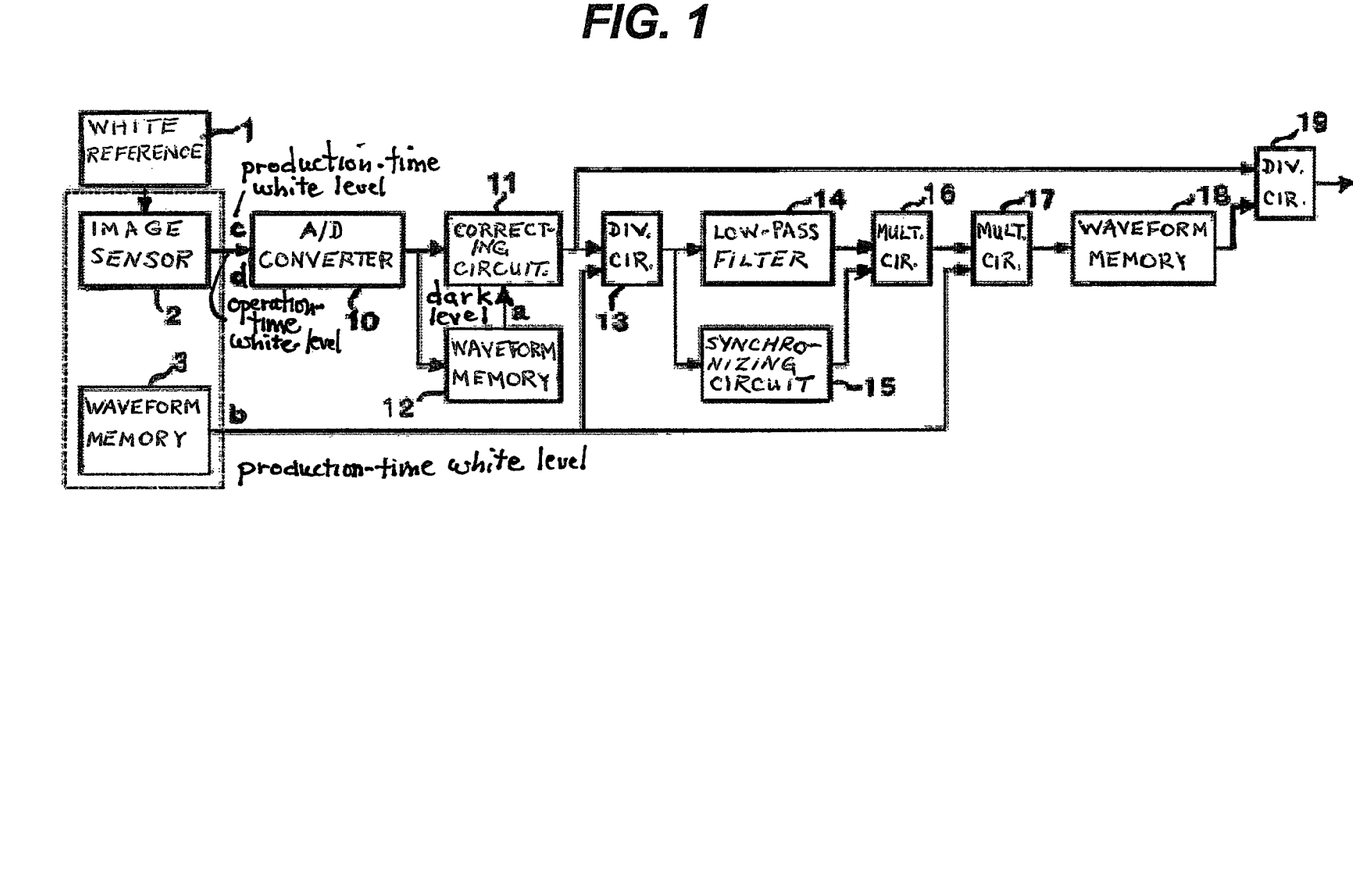
FIG. 1 is a diagram illustrating a main circuit configuration of a scanner device that employs a method for correcting shading according to an embodiment of the invention.

Regarding a circuit configuration, as illustrated in FIG. 1, a scanner device according to the embodiment includes an image sensor 2 that reads an image of an original and a white reference inside the device, a production-time white level waveform memory 3 that stores a production-time white level waveform b (FIG. 2) read by the image sensor 2 during the production of the device, an analog circuit and A/D converter 10 that converts a digital image signal read by the image sensor 2 into a digital image signal, a dark level waveform memory 12 that stores a dark level waveform a (FIG. 2) read by the image sensor 2 in a non-illumination state, a dark level correcting circuit 11 that performs a dark level correction (an offset correction) by subtracting a dark level waveform from an image signal waveform output from the analog circuit and A/D converter 10 by the use of the dark level waveform a (FIG. 2) stored in the dark level waveform memory 12, a first dividing circuit 13 that performs a white level correction of dividing the production-time white level waveform b (FIG. 2) stored in the production-time white level waveform memory 3 from a dark correction image signal waveform subjected to a dark correction and output from the dark level correcting circuit 11, a low-pass filter circuit 14 that outputs an image signal waveform of a broad change component caused by a temperature characteristic and a temporal change in light source or sensor sensitivity by outputting only a low-frequency component of the image signal waveform output from the first dividing circuit 13, a phase/amplitude synchronizing circuit 15 that outputs a phase/amplitude synchronizing signal for synchronizing the phase and the amplitude of the image signal waveform output from the low-pass filter circuit 14 based on the input of the white level correction image signal waveform output from the first dividing circuit 13, a first multiplying circuit 16 that outputs a result obtained by multiplying the phase/amplitude synchronizing signal output from the phase/amplitude synchronizing circuit 15 by the image signal waveform output from the low-pass filter circuit 14, a second multiplying circuit 17 that outputs a correction image signal waveform obtained by multiplying the production-time white reference level waveform b (FIG. 2) stored in the production-time white level waveform memory 3 from the image signal waveform subjected to the synchronization of the phase and the amplitude by the first multiplying circuit 16, a correction white level waveform memory 18 that stores the correction white level waveform output from the second multiplying circuit 17, and a second dividing circuit 19 that outputs a result obtained by dividing the correction white level waveform output from the correction white level waveform memory 18 from the dark correction image signal waveform output from the dark level correcting circuit 11.

In order to extract only the cycle pattern of the signal waveform caused by the phase shift of the cycle pattern, the phase/amplitude synchronizing circuit 15 includes an AC component extracting function of extracting an AC (alternating current) component from the waveform, a gentle amplitude change extracting function of extracting a gentle change in amplitude of the AC component waveform extracted by the AC component extracting function by a peak holding low-pass filter, and a sine wave synthesizing function of synthesizing a sine wave having a matched phase by a phase synchronizing circuit.

Further, in the above-described embodiment, an example of using the low-pass filter circuit 14 has been described. However, the invention is not limited to the low-pass filter. Here, a change in shading caused by a change in light source or sensor sensitivity broadly occurs in the entire waveform and the component has a low frequency. Thus, any circuit capable of extracting only a component lower than an appropriate frequency may be used.

[Operation]

The scanner device that employs the method for correcting shading according to the embodiment first performs a first step in which a control unit (not illustrated) stores a production-time white level signal waveform (which is indicated by the sign b of FIG. 3 and has a sine wave shape as illustrated in an enlarged view of a cycle pattern of a lens array as a cycle of approximately seven pixels) obtained as a reference by the image sensor 2 and a white reference 1 in a normal state during the production of the device in the production-time white level waveform memory 3 and then performs a second step in which the dark level correcting circuit 11 performs a dark level correction by using the dark level waveform (which is indicated by the sign a of FIG. 2) output from the dark level waveform memory 12 and the image signal waveform output from the analog circuit and A/D converter 10, a third step in which a white reference provided inside the device is read by the image sensor 2 during the operation of the device and an operation-time white level waveform (which is indicated by the sign d of FIG. 3 and includes a decrease in white reference level due to the noise 9 in time as illustrated in an enlarged view of the upper part of FIG. 2) in the operation state is read and stored in a memory (not illustrated), and a fourth step in which the production-time white level waveform (which is indicated by the sign c of FIG. 3) stored in the production-time white level waveform memory 3 is divided from the operation-time white level waveform (which is indicated by the sign d of FIG. 3) stored in the memory by using the first dividing circuit 13.

Figure 3A:
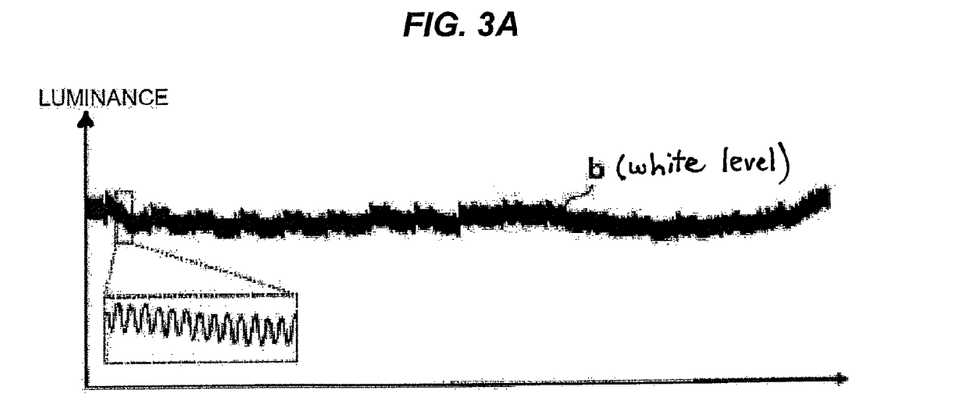
FIG. 3 is a diagram illustrating a signal waveform according to the embodiment.
Figure 3B:
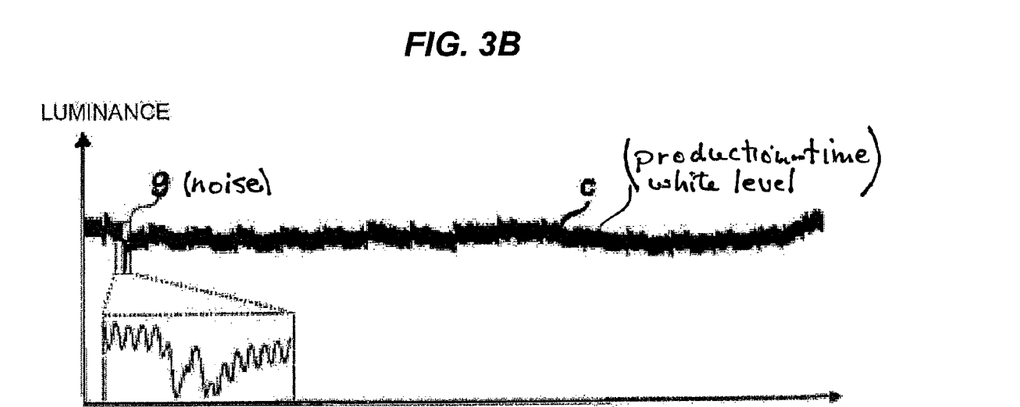
Figure 3C:
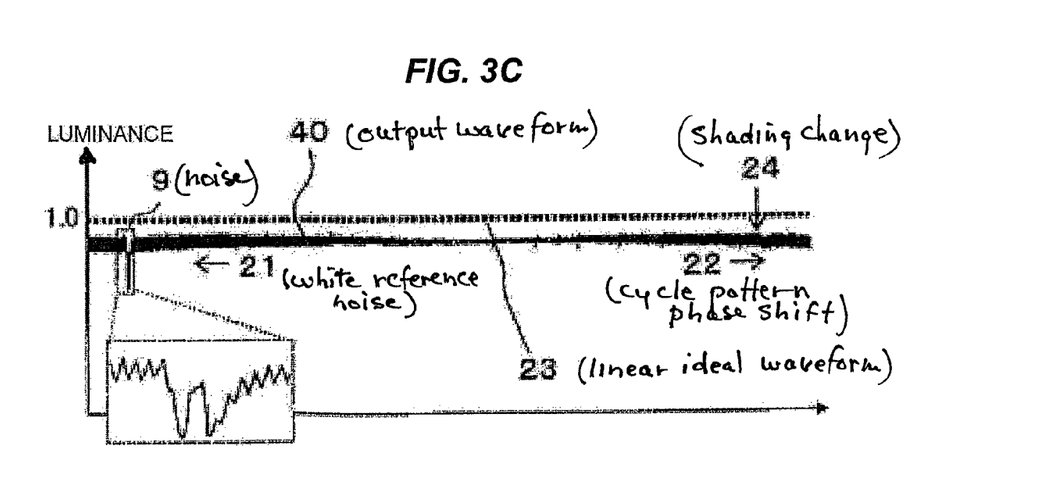

As for a process of dividing the operation-time white level waveform by the production-time white level waveform in the fourth step, when the operation-time white level waveform is completely equal to the production-time white level waveform, the waveform subjected to the dividing process is obtained as a linear ideal waveform 23 (which is obtained as the equation of the production-time white level waveform=the operation-time white level waveform as illustrated in FIG. 3(c)). However, since an actual waveform has a "decrease in entire level (degradation in light source)" and a "change in entire shading (in this example, the right end is darker than the other part)" as indicated by the sign 24 and also has a "noise of a white reference" and a "phase shift of a cycle pattern caused by a minute telescopic movement of a lens array" as indicated by the signs 21 and 22, an ideal waveform is not obtained. As illustrated in FIG. 3(c), an output waveform 40 of fourth step which does not change in the vicinity of the center and changes toward both ends is obtained. When the noise 9 exists, the brightness is partially decreased as illustrated in an enlarged view of the lower part of the drawing.

Figure 4A:
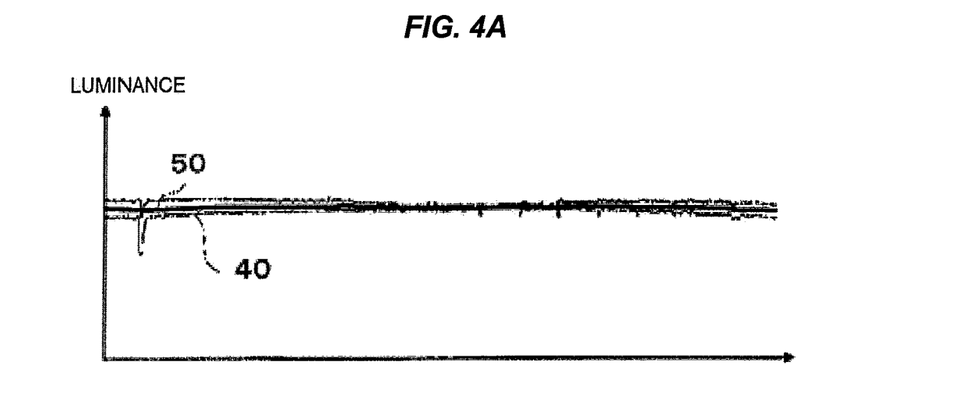
FIG. 4 is a diagram illustrating a signal waveform according to the embodiment.

Next, the scanner device according to the embodiment performs a fifth step in which the low-pass filter circuit 14 allows the passage of only the low-frequency component of the image signal output from the first dividing circuit 13 so that only an output waveform 50 of a low-frequency component illustrated in FIG. 4(a) is output and hence a broad change component (an image signal waveform of a broad change component) caused by a temporal change in light source or sensor sensitivity and a temperature characteristic is obtained.

A method of extracting the low-frequency component by the fifth step is not limited to the method of using the low-pass filter. Here, a change in shading caused by a change in light source or sensor sensitivity broadly occurs in the entire waveform and the component has a low frequency. Thus, any circuit capable of extracting only a component lower than an appropriate frequency may be used.

Figure 4B:
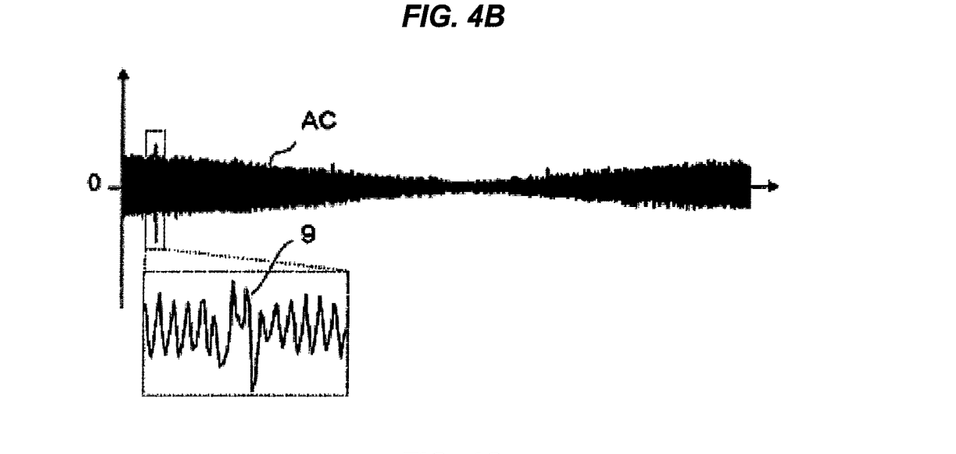
Figure 4C:
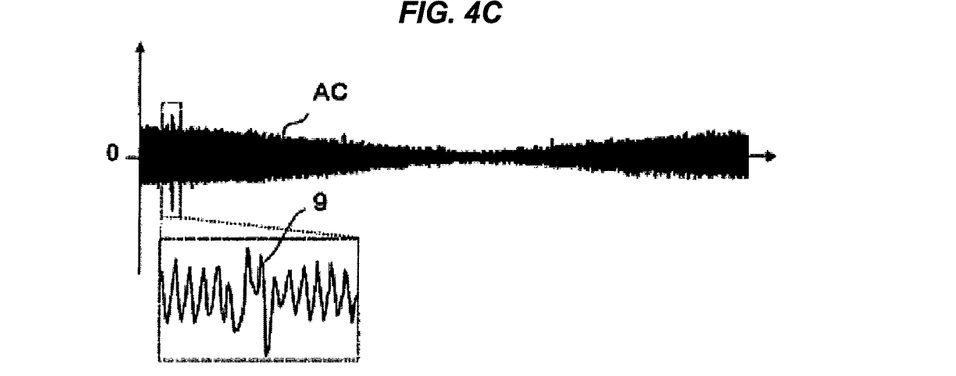
Figure 5A:
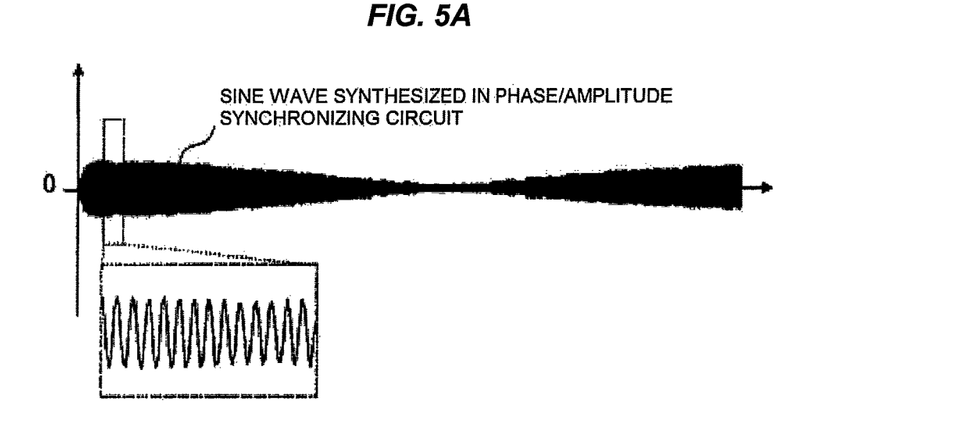
FIG. 5 is a diagram illustrating a signal waveform according to the embodiment.

Next, the scanner device according to the embodiment performs a sixth step in which the phase/amplitude synchronizing circuit 15 extracts only the cycle pattern of the output waveform of the first dividing circuit 13 by using a characteristic in which a signal caused by a phase shift of a cycle pattern is similar to a sine wave, a characteristic in which a frequency component changes slightly while being substantially fixed, and a characteristic in which an amplitude gently changes within a predetermined range so as to extract an AC (alternating current) component illustrated in FIG. 4(b) and to extract a gentle change in amplitude by an amplitude peak holding low-pass filter illustrated in FIG. 4(c) and synthesizes a sine wave having a matched phase by a phase synchronizing circuit illustrated in FIG. 5(a) so as to output a sine wave 90 in which only a cycle pattern caused by a cycle shift of a lens array is extracted without any noise.

The phase/amplitude synchronizing circuit 15 is used to separately extract a cycle pattern caused by a phase shift of a lens cycle pattern from a low-frequency component or a noise component. Accordingly, the phase/amplitude synchronizing circuit 15 performs a process (a) of removing the low-frequency component (here, a general AC component is extracted by a signal process), a process (b) of extracting an amplitude component by a peak holding low-pass filter, and a process (c) of synchronizing a phase by a PLL (a phase synchronizing circuit). Here, as for the process (a) of extracting the AC component, the output signal of the low-pass filter may be decreased from the input signal thereof by the use of the low-pass filter capable of sufficiently decreasing the frequency component of the cycle pattern of the lens. For example, if the scan width is 300 mm and the lens cycle is 0.3 mm, the frequency of the lens cycle is 1000 Hz when the frequency of the scan cycle is 1. As for the characteristic of the IIR low-pass filter, the cutoff frequency is desirably 75.3 Hz and the gain for the frequency of 1000 is desirably 22.2 dB.

Figure 5B:
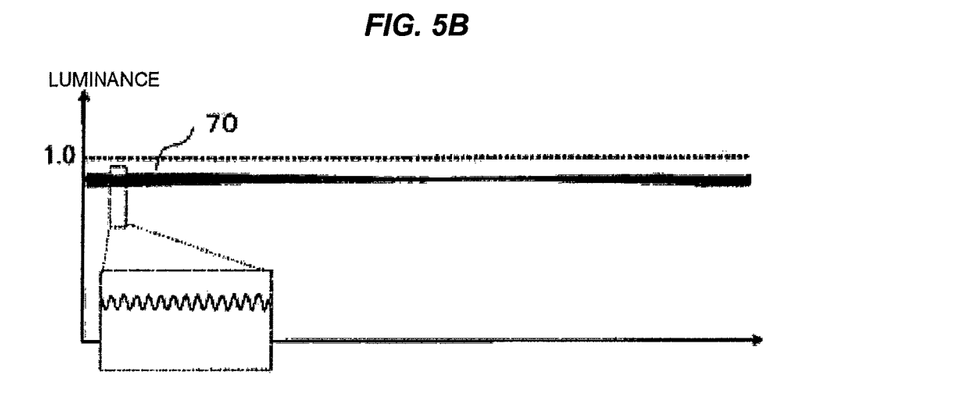
Figure 5C:
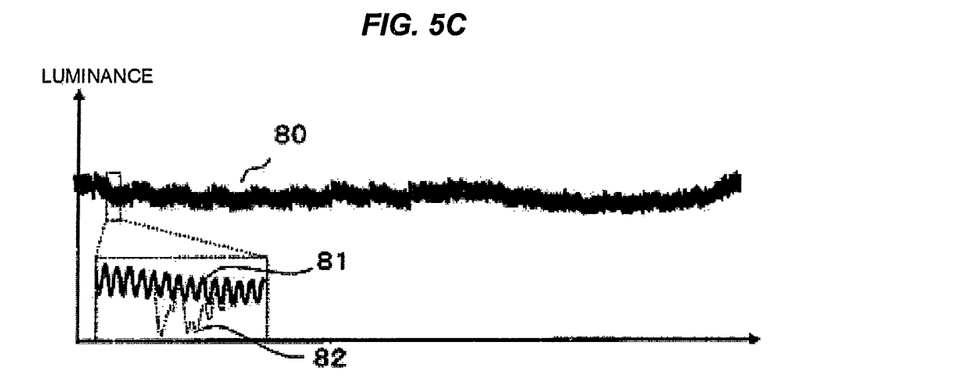

Next, the scanner device according to the embodiment performs a seventh step in which the first multiplying circuit 16 multiplies (synthesizes) the output of the low-pass filter circuit 14 and the output of the phase/amplitude synchronizing circuit 15 so as to synthesize an output waveform 70 of an image signal in which a noise is removed and only a pattern caused by a phase shift of a cycle pattern and a broad change due to a change in light source is extracted as illustrated in FIG. 5(b) and an eighth step in which an image signal output waveform 80 illustrated in FIG. 5(c) and obtained in the first multiplying circuit 16 by multiplying (synthesizing) a waveform extracting only a pattern in which the noise is removed and which is caused by the phase shift of the cycle pattern of the lens array and the broad change due to a change in light source by the production-time white level waveform stored in the production-time white level waveform memory 3 is stored in the correction white level waveform memory 18.

The image signal waveform which is stored in the correction white level waveform memory 18 in the eighth step corresponds to a correction-purpose image signal waveform obtained in consideration of only shading factors (the broad change component caused by a temperature and time+the cycle pattern caused by the phase shift of the lens cycle pattern) in a manner such that the broad change component caused by a temporal change in light source or sensor sensitivity and a temperature characteristic output from the low-pass filter circuit 14 is synthesized with the cycle pattern caused by the phase shift of the lens cycle pattern separated from the low-frequency component or the noise component output from the phase/amplitude synchronizing circuit 15 by the first multiplying circuit 16 and the synthesized waveform (the broad change component caused by a temperature in time+the cycle pattern caused by the phase shift of the lens cycle pattern) is multiplied (synthesized) by the production-time white level waveform stored in the production-time white level waveform memory 3 based on the clean white member (the white reference) by the second multiplying circuit 17.

Finally, the scanner device according to the embodiment can correct shading as illustrated in a pre-correction state 82 to a post-correction state 81 of FIG. 5(c) by dividing the correction-purpose image signal waveform stored in the correction white level waveform memory 18 from the image signal waveform subjected to the dark level correction (offset correction) by the dark level correcting circuit 11.

In this way, the scanner device and the method for correcting shading according to the embodiment can perform a shading correction of removing shading factors by removing the correction-purpose image signal waveform from the image signal waveform subjected to the dark level correction (offset correction) in consideration of the shading factors including the broad change component caused by a temporal change in light source or sensor sensitivity and a temperature characteristic and the phase shift of the cycle pattern of the lens array.

EXPLANATIONS OF LETTERS OR NUMERALS

1: white reference inside device
2: image sensor
3: production-time white level waveform memory
8: original character
9: noise
10: analog circuit and A/D converter
11: dark level correcting circuit
12: dark level waveform memory
13: first dividing circuit
14: low-pass filter circuit
15: phase/amplitude synchronizing circuit
16: first multiplying circuit
17: second multiplying circuit
18: correction white level waveform memory
19: second dividing circuit
21: cycle pattern phase shift
22: cycle pattern phase shift
23: ideal waveform
24: decrease in entire level and change in entire shading
40: output waveform of fourth step
50: output waveform of fifth step
70: output waveform of seventh step
80: output waveform of eighth step
81: output waveform of eighth step after correction
82: output waveform of eighth step before correction
90: sine wave
99: error
a: dark level waveform
b: production-time white level waveform
c: operation-time white level waveform
AC: AC component

The invention claimed is:
1. A scanner device that optically scans an image recorded on an original by an image sensor, comprising:
   an image sensor that reads an image of an original and a white reference inside the scanner device;
   a production-time white level waveform memory that stores a production-time white level waveform read by the image sensor during manufacture of the scanner device;
   an analog circuit and A/D converter that converts a digital image signal read by the image sensor into a digital image signal;
   a dark level waveform memory that stores a dark level waveform read by the image sensor in a non-illumination state;
   a dark level correcting circuit that performs a dark level correction by subtracting the dark level waveform from an image signal waveform output from the analog circuit and A/D converter by the use of the dark level waveform stored in the dark level waveform memory;
   a first dividing circuit that performs a white level correction of dividing the production-time white level waveform stored in the production-time white level waveform memory from an image signal waveform subjected to a dark correction and output from the dark level correcting circuit;

a low-pass filter circuit that outputs an image signal waveform of a broad change component caused by a temporal change in light source or sensor sensitivity and a temperature characteristic by outputting only a low-frequency component of the image signal waveform output from the first dividing circuit;

a phase/amplitude synchronizing circuit that outputs a cycle pattern caused by a phase shift of a lens cycle pattern separated from a low-frequency component or a noise component by synchronizing the phase and the amplitude of the image signal waveform output from the low-pass filter circuit based on the input of the white level correction image signal waveform output from the first dividing circuit;

a first multiplying circuit that outputs a result obtained by multiplying the cycle pattern of the phase shift output from the phase/amplitude synchronizing circuit with the image signal waveform of the broad change component output from the low-pass filter circuit;

a second multiplying circuit that outputs a correction white level waveform obtained by multiplying the production-time white reference level waveform stored in the production-time white level waveform memory from the image signal waveform obtained by multiplying the cycle pattern of the phase shift and the image signal waveform of the broad change component by the first multiplying circuit;

a correction white level waveform memory that stores the correction white level waveform output from the second multiplying circuit; and a dividing circuit that outputs a result obtained by dividing the correction white level waveform output by the correction white level waveform memory from the dark correction image signal waveform output by the dark level correcting circuit.

2. The scanner device according to claim 1, wherein in order to extract only the cycle pattern of the signal waveform caused by the phase shift of the cycle pattern, the phase/amplitude synchronizing circuit includes an AC component extracting function of extracting an AC component from a waveform, an amplitude change extracting function of extracting a change in amplitude of an AC component waveform extracted by the AC component extracting function by the use of a peak holding low-pass filter, and a sine wave synthesizing function of synthesizing a sine wave having a matched phase by a phase synchronizing circuit.

3. A method for correcting shading in a scanner device including an image sensor that reads an image of an original and a white reference inside the scanner device, a production-time white level waveform memory that stores a production-time white level waveform read by the image sensor during manufacture of the device, an analog circuit and A/D converter that converts a digital image signal read by the image sensor into a digital image signal, a dark level waveform memory that stores a dark level waveform read by the image sensor in a non-illumination state, and a dark level correcting circuit that performs a dark level correction by subtracting the dark level waveform from the image signal waveform output from the analog circuit and A/D converter by the use of the dark level waveform stored in the dark level waveform memory and optically scanning the image of the original by the image sensor, the method for correcting shading comprising:
a first dividing step of performing a white level correction of dividing the production-time white level waveform stored in the production-time white level waveform memory from the image signal waveform subjected to a dark correction and output by the dark level correcting circuit;

a low-pass filter step of outputting an image signal waveform of a broad change component caused by a temporal change in light source or sensor sensitivity and a temperature characteristic by outputting only a low-frequency component of the image signal waveform output by the first dividing step;

a phase/amplitude synchronizing step of outputting a cycle pattern caused by a phase shift of a lens cycle pattern separated from a low-frequency component or a noise component by synchronizing the phase and the amplitude of the image signal waveform output from the low-pass filter step based on the input of the white level correction image signal waveform output by the first dividing step;

a first multiplying step of outputting a result obtained by multiplying the cycle pattern of the phase shift output in the phase/amplitude synchronizing step by the image signal waveform of the broad change component output in the low-pass filter step;

a second multiplying step of outputting a correction white level waveform obtained by multiplying the production-time white reference level waveform stored in the production-time white level waveform memory from the image signal waveform obtained by multiplying the cycle pattern of the phase shift and the image signal waveform of the broad change component in the first multiplying step;

a correction white level waveform memory step of storing the correction white level waveform output in the second multiplying step; and a second dividing step of outputting a result obtained by dividing the correction white level waveform output in the correction white level waveform memory step from the dark correction image signal waveform output in the dark level correction step.

4. The method for correcting shading according to claim 3, wherein in order to extract only the cycle pattern of the signal waveform caused by the phase shift of the cycle pattern, the phase/amplitude synchronizing step includes an AC component extracting step of extracting an AC component from a waveform, an amplitude change extracting step of extracting a change in amplitude of an AC component waveform extracted by the AC component extracting step by the use of a peak holding low-pass filter, and a sine wave synthesizing step of synthesizing a sine wave having a matched phase by a phase synchronizing step.

* * * * *